United States Patent [19]

Araki

[11] Patent Number: 4,774,570

[45] Date of Patent: Sep. 27, 1988

[54] SYSTEM FOR PROCESSING VIDEO SIGNAL FOR DETECTING CHANGES IN VIDEO DATA AND SECURITY MONITORING SYSTEM UTILIZING THE SAME

[75] Inventor: Shoji Araki, Kanagawa, Japan

[73] Assignee: Sony Corporation, Tokyo, Japan

[21] Appl. No.: 97,496

[22] Filed: Sep. 16, 1987

[30] Foreign Application Priority Data

Sep. 20, 1986 [JP] Japan .................................. 61-222689
Sep. 20, 1986 [JP] Japan .................................. 61-222690

[51] Int. Cl.$^4$ .............................................. H04N 7/18
[52] U.S. Cl. ...................................... 358/108; 358/105
[58] Field of Search ................ 358/108, 105; 340/506, 340/541, 825.31, 825.34

[56] References Cited

U.S. PATENT DOCUMENTS

| 4,160,948 | 7/1979 | Kamin | 358/108 X |
| 4,198,653 | 4/1980 | Kamin | 358/108 |
| 4,257,063 | 3/1981 | Loughry et al. | 358/108 |
| 4,337,481 | 6/1982 | Mick et al. | 358/108 X |
| 4,458,266 | 7/1984 | Mahoney | 358/108 X |
| 4,630,110 | 12/1986 | Cotton et al. | 358/108 |
| 4,679,077 | 7/1987 | Yuasa et al. | 358/108 |

Primary Examiner—Howard W. Britton
Assistant Examiner—Victor R. Kostak
Attorney, Agent, or Firm—Philip M. Shaw, Jr.

[57] ABSTRACT

A video signal processing system which detects a change of the video data in the video signal supplied by a source by comparing the source video signal with a variable reference signal derived from a predetermined number of sampled fields of the source video signal but which excludes the video data of those pixels whose video data fluctuates during the sampled frames.

28 Claims, 8 Drawing Sheets

SYSTEM FOR PROCESSING VIDEO SIGNAL FOR DETECTING CHANGES IN VIDEO DATA AND SECURITY MONITORING SYSTEM UTILIZING THE SAME

BACKGROUND OF THE INVENTION

1. Field of the Invention

The present invention relates generally to a system for processing video signals from a television camera, a video camera or the like and more specifically to a system for processing video signals to detect changes in the image data. In particular, the invention relates to a video signal processing system for use in a security monitor system for monitoring a predetermined area to detect abnormalities in the monitoring area.

2. Description of the Background Art

Security monitor systems have been widely employed in various places, such as banks or super markets for preventing theft. In such security monitor systems video cameras, television cameras or still cameras are employed for picking-up the video image in the area to be monitored, which area to be monitored will be hereafter referred to as the "monitoring area". In the following disclosure, the video camera, television camera, etc. for continuously picking-up the image of the monitoring area, will be generally referred to as the "camera".

In a typical security monitor systems, video signals produced by the camera are monitored to detect changes in the video data for detecting a change of condition in the monitoring area. The video signals are reproduced on a monitor screen, such as a cathode ray tube (CRT) and/or recorded by means of a video tape recorder (VTR). Visual monitoring requires an operator to monitor the screen for detecting a change of condition in the monitoring area. When the video signal is recorded on a VTR tape for later viewing in the event of a theft, etc., the recording time is strictly limited. Therefore, in order to record all of the video signal during the period of monitoring requires extensive lengths of VTR tape. In some security monitor systems, the recording time has been expanded by only recording the video data of every other so many fields. However, in this case, when a change of the condition in the monitoring area occurs outside of the recording interval, the change cannot be recognized.

In order to solve the aforementioned problems in the prior art, there has been proposed a video signal processing system which can automatically monitor video signals for detecting changes in the video data of the video signals. Such a system has been disclosed in the Japanese Utility Model First (unexamined) Publication (Jikkai) Showa 53-1120226. In the disclosed system, video data is compared with video data in the immediately preceding field. The number of changes in the corresponding pixels of the successive fields is counted. The counted value is compared with a preset threshold value for detecting a change in the condition in the monitoring area. That is, when the counted value is greater than the threshold value, a determination can be made that the video data is changed and thus a determination can be made that a condition in the monitoring area is changed.

Such a system will operate automatically for detecting a change of the video data. On the other hand, in such system, it is extremely important to prevent the system from erroneously detecting a change of the video data due to signal noise being superimposed on the video signal. For example, when the flicker cycle period of a fluorescent lamp in the monitored area is not synchronous with the image pick-up cycle period, flicker "noise" can be superimposed on the video signal. This flicker noise tends to cause a change in the video data for a relatively large number of pixels. In such a case, an erroneous detection of the change in video data is inevitably made although the condition in the monitoring area is unchanged. To avoid the effects of noise it is preferred to set the threshold value at a sufficiently high value. On the other hand, a greater threshold value to be compared with the counted value will lower the sensitivity to detecting changes in the video data. Therefore, when a relatively small, but actually occurring change in the video signal occurs, such a small change can be overlooked due to dulled sensitivity.

SUMMARY OF THE INVENTION

Therefore, it is an object of the invention to provide a video signal processing system which can detect changes in the video data of a video signal with a satisfactorily high sensitivity while avoiding the possibility of erroneous detection due to signal noise or the like.

Another object of the invention is to provide a video signal processing system which is suitable for a security monitor system.

In order to accomplish the aforementioned and other objects, a video signal processing system, according to the present invention, employs a variable reference signal to be compared with a video signal for detecting a change of the video data in the video signal. The reference signal is derived based on the video data in a given number of preceding fields of the video signal. In deriving the reference signal, the video data of pixels whose video data fluctuates in a given number of preceding fields of the video signal are excluded. These video data fluctuating pixels form dead regions in which changes in the video data of the video signal with respect thereto are ignored.

According to one aspect of the invention, a video signal processing system for detecting a change in the video data of a video signal from an external source comprises a reference signal generator means for sampling a predetermined number of fields of the video signal and deriving a reference signal on the basis of the video data of the sampled predetermined number of fields. A detector means detects changes in such video data by comparing each field of video signals with said reference signal. The detector maans produces a change detection signal when a change in the video data is detected.

In deriving the reference signal, the reference signal generator means compares a predetermined number of sampled fields of video signals and detects pixels for which the video data fluctuates. The video data for such pixels is thereafter excluded in deriving the reference signal so that the video data change detection operation takes place only for those pixels whose video data is held constant over the sampled fields. The pixels whose video data fluctuates within a predetermined number of sampled fields are regarded as unstable pixels which can be ignored in deriving the reference signal. Therefore, avoiding such pixels when determining if there are changes in the video data successfully avoids erroneous detection due to ambient signal noise.

Preferably, the video signal processing system further comprises a binary signal generator means for converting an analog video signal received from said video signal source into corresponding binary value digital video signals. The reference signal generator means then samples the digital video signals for producing a digital reference signal, and the detector means compares the digital video signal with the digital reference signal for detecting a change in the video data in the digital video signal. The digital video signal and the digital reference signal are suitable for input to a digital processor. The binary signal generator means converts the analog video signal into the digital video signal by comparing the analog video signal level with a given threshold. The video signal processing system can further comprise a manually operable means, associated with the binary signal generator means, for manually adjusting the threshold value.

In practice, the digital video signal can contain logical values representative of the signal level of the respective pixels, and the reference signal generator means can produce a reference signal containing logical data components of each pixel, which logical data components are composed of an OR data component of the corresponding logical values of the sampled fields of video signals and an exclusive OR data component of the OR data component and an AND data component of the logical values. The detector means receives the digital video signal and performs a logical OR operation for deriving the OR data component of the logical value and the exclusive OR data component of the reference signal with respect to each pixel and performs a logical exclusive OR operation for deriving an exclusive OR data component of the derived OR data component and the OR data component of the reference signal. The detector means then checks the exclusive OR data component for detecting a change in the video data with respect to each pixel.

The reference signal generator means is set for initial predetermined values of the OR data components and the AND data components for all of the pixels so that the exclusive OR data component derived by the detector means becomes a predetermined value when the video data of all of the pixels are held unchanged. The detector means compares the exclusive OR data of each pixel with the predetermined value for detecting a change of the video data.

The reference signal generator can be operable for updating the reference signal cyclically at given intervals so that the influence on the video signal source of variations due to environmental conditions, such as the changing irradiation angle of the sun light or so forth, can be successfully avoided.

According to another aspect of the invention, a security monitor system comprises a video camera directed to a predetermined monitoring area to be monitored for picking up a video image of the monitoring area to produce a video signal. A video signal processing system constructed in accordance with the invention as described above detects changes in the video data contained in the video signal from the video camera. An alarm which is responsive to the change detection signal provides an audible or visual notification of a change in the condition in the monitoring area.

In the preferred construction, the security monitor system can further comprise a recording means responsive to the change detection signal for recording the current video signal when the change detection signal is generated. The recording means comprises a video printer for printing a video image of the monitoring area on the basis of the current video signal at the occurrence of the change detection signal. In the alternative, the recording means comprises a video tape recorder which is responsive to the change detection signal for recording the then current video signal for a given period of time. Such a recording means is useful in making a record of the monitoring area when the conditions therein change. A security monitor system according to the invention can further comprise a video monitor for reproducing the video signal for visual observation of the monitoring area via a monitor screen.

In a practical construction, the security monitor system can be active for monitoring changes in the video data for the pixels in a limited section of one field of video signals. Corresponding to this, the reference signal generator means generates the reference signal containing reference data to be compared with the video data of the pixels within the limited section. In this case, the security monitor system can further include a memory having a first memory block for storing the video data of the pixels within the limited section and a second memory block for storing the reference signal. By reducing the area which is monitored for changes in the video data, the speed for processing the video signal can be increased. In addition, by limiting the area to be monitored, the capacity for storing the video data and the reference data can be reduced. In this case, only the video data corresponding to the pixels in the limited section has to be detected.

To accomplish this limited viewing capability, the security monitor system can further include a synchronization signal separator circuit for separating the synchronization signals in the video signal and a pixel coordinate detecting means for receiving the separated synchronization signal and detecting the pixel positions in one field of video image. In this way the video data corresponding to the pixels within the limited section can be detected and the video data of the pixels within the limited area in the first memory block of the memory means can be stored.

The video signal source means can comprise a plurality of cameras of different channels respectively directed to different monitoring areas for picking-up video images thereof, and a switcher means for switching the connection between the cameras and the video signal processing system according to a predetermined schedule. The switcher means switches the channels of the video signals to be visually reproduced on the video monitor screen according to a given schedule which is independent of the predetermined schedule for switching channels of the video signals in the video signal processing system.

According to the invention, a method is employed for processing a video signal detect changes in the video data contained in a video signal generated by an external source. The method comprises the steps of:

sampling a predetermined number of fields of video signals;

deriving a reference signal on the basis of the video data of the sampled predetermined number of fields of video signals;

detecting a change in the video data in the video signal by comparing each field of video signals with the reference signal; and producing a change detection signal when a change in the video data is detected.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings

DESCRIPTION OF THE PREFERRED EMBODIMENT

Figure 1:
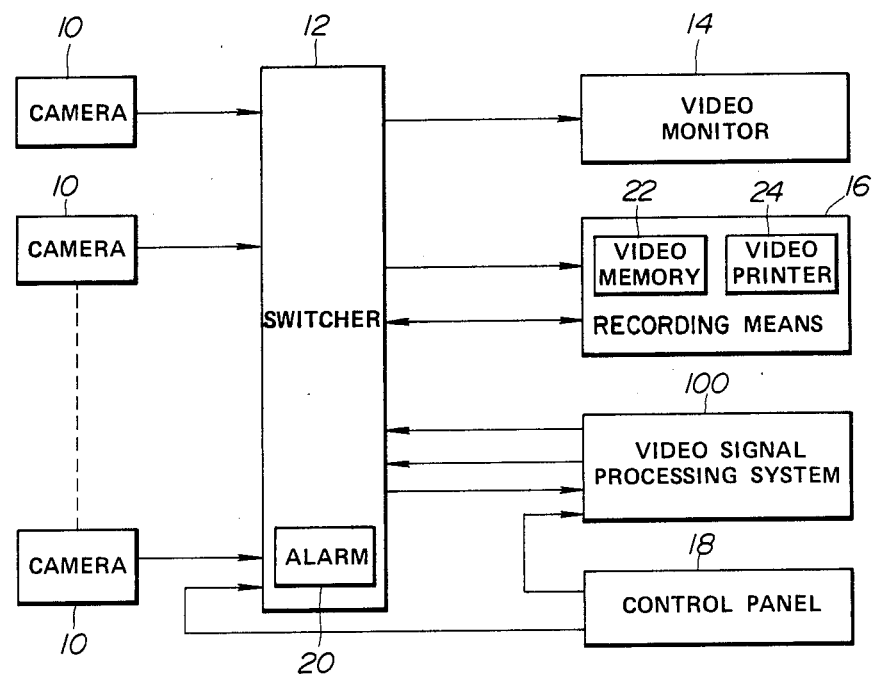
FIG. 1 is a schematic block diagram of the preferred embodiment of a security monitor system according to the present invention.

Referring now to the drawings, particularly to FIG. 1, the preferred embodiment of a video signal processing system, according to the present invention, will be disclosed herebelow in conjunction with a security monitor system for detecting changes in the condition of a predetermined monitoring area.

As shown in FIG. 1, the preferred embodiment of the security monitor system includes one or more cameras 10 and utilizes to which the preferred embodiment of the video signal processing system 100. Each camera 10 is focused on a separate, predetermined monitoring area (not shown) to pick-up separate video images of the corresponding monitoring areas. The cameras 10 continuously output video signals, each of which contains data of the picked-up video image of the corresponding monitoring area.

The cameras 10 output their video signals to a switcher 12. The switcher 12 is connected to a video monitor 14, such as a CRT video screen, a recording device 16, such as a video memory 22, a video printer 24, and the preferred embodiment of the video signal processing system 100. A manually operable control panel 18 is also connected to control the switcher 12 and the video signal processing system 100.

The switcher 12 continuously receives video signals output from the cameras 10. The switcher 12 is programmed to select one of the video signals according to a predetermined schedule and feed the video signal to the monitor device 14. The monitor device 14 reproduces the video signal received from the switcher on a monitor screen as a visual image.

The schedule of selection of the video signals fom various cameras can be preset in the switcher 12 for switching the connection between the camera and the monitor device at given intervals and in a given order. The switcher 12 can also be responsive to a camera selection command input through the control panel 18 to select which one of cameras is connected to the monitor device 14 irrespective of the predetermined order. The interval for switching the cameras can be determined to be long enough for visual observation of the displayed picture for checking the condition of the monitoring area, and to be short enough to successfully monitor various areas.

The switcher 12 also selectively connects one of the cameras 10 to the video signal processing system 100. As in the case of the cameras, the switcher 12 switches the connection between the cameras and the video signal processing system 100 at predetermined intervals and in a given order. However, selection of the cameras to be connected to the video signal processing system 100 is performed independently of selection of the cameras to be connected to the monitor device 14. The switching interval for the connection between the cameras 10 and the video signal processing system 100 is generally shorter than that for the switching connection between the cameras and the monitor devices. Fundamentally, the switching timing for the connection between the cameras and the video signal processing system is determined according to the process speed of the video signal processing system. Namely, the switching interval for the switching connection between the cameras 10 and the video signal processing system 100 is set slightly longer than or equal to the possible maximum process period for processing of one field of video signal.

Figure 2:
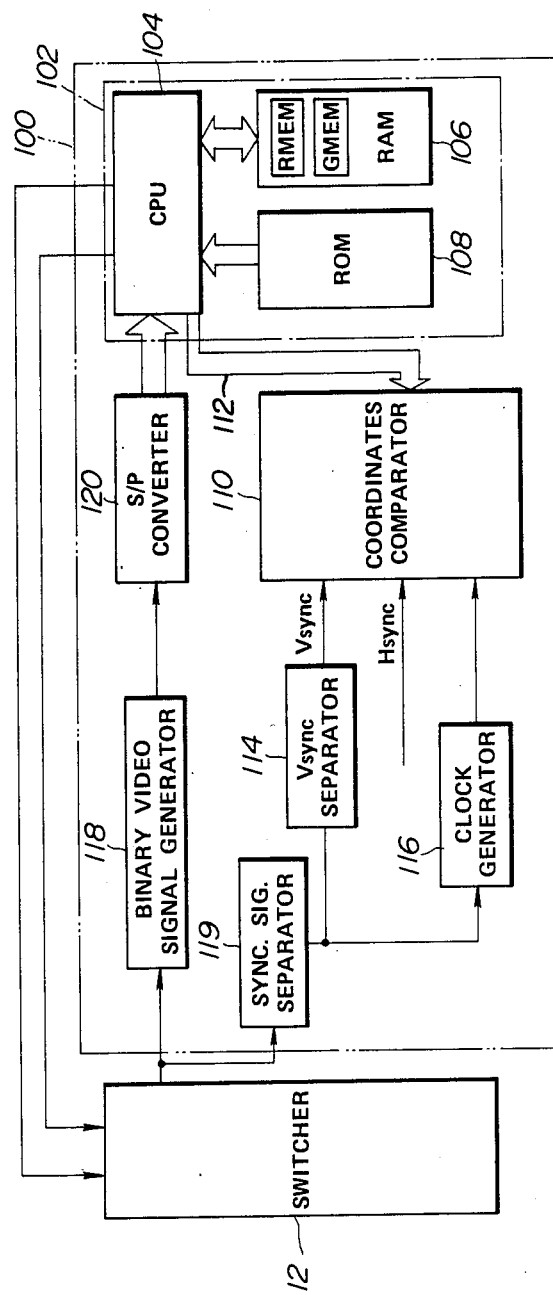
FIG. 2 is a block diagram of the preferred embodiment of a video signal processing circuit employed in the security monitor system of FIG. 1.

The video signal processing system 100 includes a binary video signal generator circuit 118 (FIG. 2). The binary video signal generator circuit 118 generally serves as an analog-to-digital converter for converting the analog video signals input from the cameras 10 via the switcher 12 into binary video signals indicative of the video data. In order to convert the analog video signal into the digital video signal, a threshold level is set in the binary video signal generator circuit 118. According to the shown embodiment, the threshold level to be used is manually adjustable through the control panel 18.

The video signal processing system 100 compares the binary video signal with a reference signal which is indicative of reference video signal data. When the binary video signal matches the reference signal, a determination is made that the video data is unchanged and thus the condition of the corresponding monitoring area is unchanged. On the other hand, when the binary video signal does not match the reference signal, a determination is made that a change in the video data has occurred and thus that a change in the condition in the corresponding monitoring area has occurred.

In the latter case, the video signal processing system 100 generates a signal indicative of a change in the video data, which signal will be hereafter referred to as a "change detection signal". This change detection signal is fed to an alarm generator 20 (FIG. 1) which is incorporated in the switcher 12 in the shown embodiment. The alarm generator 20, in response to the change detection signal, generates an alarm. The alarm generator 20 can comprise a bell, a buzzer, or a flashing light, for example.

It should be appreciated that, though the shown embodiment provides the alarm generator in the switcher 12, it is, of course, possible to provide the alarm generator as an independent component of the security monitor system. Also, the alarm generator 20 can be an external component to be connected to the security monitor system.

In the shown embodiment, the switcher 12 is also responsive to the change detection signal for producing an operation command for the recording device 16. Also supplied to the recording device 16 from the switcher 12 is a video signal representative of the video data of the monitoring area in which a change of the video data has been detected. The recording device 16 is thus activated to record the video data input from the switcher 12. In the shown embodiment, the video memory 22 is then activated to record the video data fed from the switcher 12. Simultaneously, the video printer 24 becomes active to print a still image of the monitoring area based on the video information recorded in the video memory 22.

A VTR can be used as the recording device 16. When a VTR is used as the recording device, the VTR will be activated in response to the operation command for performing the video data recording operation. The VTR may be maintained in operation for a given period of time to monitor the monitoring area for the given period.

FIG. 2 shows the construction of the preferred embodiment of the video signal processing system 100 in more detail. Though the video signal processing system 100 is intended to be used in conjunction with a multi-channel security monitor system designed for monitoring a plurality of monitoring areas, the following discussion will be given for single-channel video signal processing for the video signal from a single camera for simplification of the disclosure and for avoiding confusion.

The video signal processing system 100 comprises a digital circuit including a microprocessor 102. The microprocessor 102 is composed of a CPU 104, a RAM 106 and a ROM 108. A coordinates comparator 110 is connected to the CPU 104 via a bus 112. A synchronization signal separator circuit 119 strips out the synchronization signals from the video signal. The synchronization signal separator circuit 119 is connected to a vertical synchronization signal separator circuit 114, a clock signal generator circuit 116 and the coordinates comparator 110. The coordinates comparator 110 receives a vertical synchronization signal Vsync from the vertical synchronization signal separator circuit 114 and a horizontal synchronization signal from the synchronization signal separator circuit 119. The coordinates comparator 110 is also connected to the clock generator 116 to receive therefrom a clock signal having a given frequency, e.g. 4 MHz. The coordinates comparator 110 determines the address of the video data of each pixel on the basis of the vertical synchronization signal Vsync, the horizontal synchronization signal Hsync and the clock signal. The address given for the video data of each pixel identifies a memory block for storing the video data in a memory area RMEM of RAM 108.

The video data component of the video signal input from the switcher 12 is fed to the binary video signal generator 118. The binary video signal generator 118 converts the analog video signal to a corresponding digital video signal. The binary video signal output from the binary video signal is in the form of serial data and is fed to a serial-to-parallel (S/P) converter circuit 120. The S/P converter circuit 120 converts the received serial video signal into parallel data. This parallel data is fed to the CPU 104. In synchronism with this, the address data representative of the address of the corresponding memory block is input to the CPU 104 from the coordinates comparator 110 via the bus 112. Therefore, the CPU 104 transfers the parallel data to a memory block identified by the address data. Thus, the video data of each pixel can be stored in the RMEM area in the RAM 106.

It is possible to store the video data for one whole field of the video signal in the RMEM memory area. However, a greater volume of data requires a greater storage capacity and requires a longer processing time. For security monitoring purposes it is not necessary to monitor all of the video data in a field. By monitoring some predetermined section or sections in one field, changes occurring in the monitoring area can be successfully detected. By only partially monitoring all of the available video data, the required memory capacity can be smaller and the required processing time can be shortened.

Figure 3:
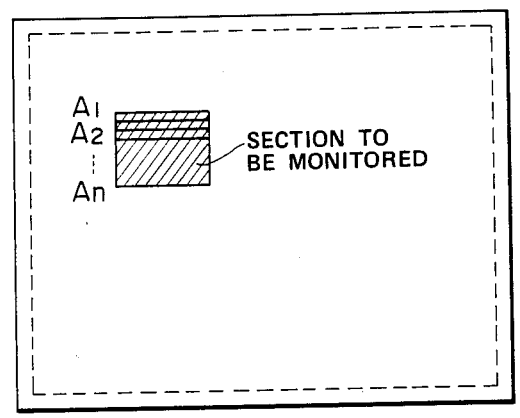
FIG. 3 is an explanatory illustration showing an image field with a region in which changes in the video data are checked.
Figure 4:
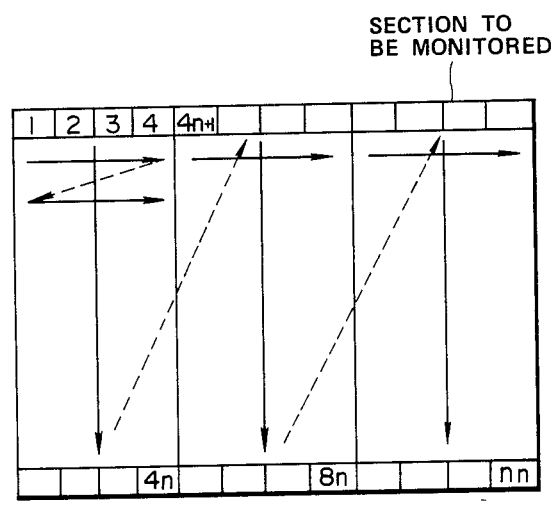
FIG. 4 is an explanatory illustration showing the manner of storing the video data in an RMEM region in a memory.

Therefore, according to the shown embodiment, the video data of the pixels residing in only a limited area is monitored. An example of the section monitored for a change in the video data is shown by the hatched area in FIG. 3. As will be appreciated from FIG. 3, in the shown example, only the video data of the pixels on the horizontal scanning lines $A_1, A_2 \ldots A_n$ is monitored. This also allows the capacity of the S/P converter circuit 120 to be smaller. Furthermore, in the shown embodiment, the RMEM area of RAM 106 is divided into 4-bite columns. The capacity of the S/P converter circuit 120 is set at 4 bites. The video data which have been serial-to-parallel converted by the S/P converter circuit 120 are stored in the RMEM area of the RAM 106 in the order shown by the arrows in FIG. 4.

In a practical operation, the coordinates comparator 110 monitors the addresses of the pixels on the basis of the vertical synchronization signal, the horizontal synchronization signal and the clock signal for detecting the pixels on the horizontal scanning lines $A_1, A_2 \ldots A_n$ and in the predetermined section on the horizontal scanning lines. In order to enable this operation, the CPU 104 feeds reference coordinate indicative signals representative of the coordinates of the pixels within the section of the field to be monitored. Such signals can be automatically generated from coordinated information input by the operator through the control panel 18. The coordinates comparator 110 compares the coordinate data derived with respect to each video data with the reference coordinate indicative signal values to detect the video data of the pixels within the section to be monitored. The reference coordinate indicative signals contain coordinate data of the first pixel coordinates on respective horizontal scanning lines. The video data of a given number of pixels, which video data are input subsequently to the video data of the first pixel on the respective horizontal scanning lines $A_1, A_2 \ldots A_n$, are thus stored in the RMEM area of RAM 106.

In the case of a multi-channel security monitor system, the sections to be monitored for changes in the video data will be set with respect to respective monitoring areas. Since the video signals in the respective monitoring channels are not synchronized with respect to each other, coordinate positions of the sections to be monitored have to be detected independently of the other channels. For this purpose, the data in the coordinates comparator 110 is reset in response to a channel switching control signal from the CPU 104. Then, the coordinates comparator waits for the subsequently input vertical scanning line before starting to derive the coordinates for the respective pixels. By this means, pixels within the section to be monitored for changes in the video data can be precisely detected.

Figure 5:
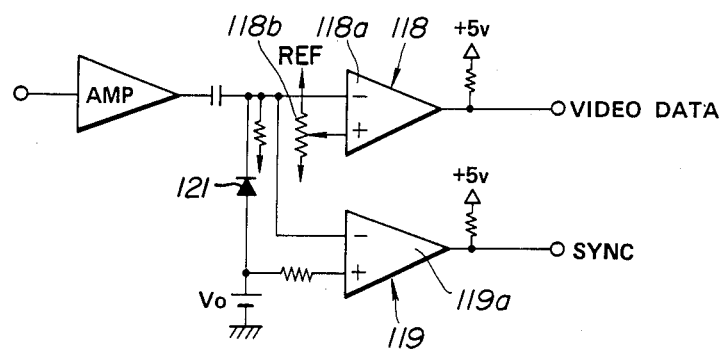
FIG. 5 is a circuit diagram of a binary video signal generator circuit and a synchronization signal separator circuit.

FIG. 5 shows a detailed construction of the binary video signal generator circuit 118 and the synchronization signal separator circuit 119. The binary video signal generator circuit 118 and the synchronization signal separator circuit 119 comprise comparators 118a and 119a. The comparator 118a forming the binary video signal generator circuit 118 has an inverting input terminal connected to a video output terminal of the switcher 12. A non-inverting input terminal of the comparator 118a is connected to a reference voltage source (REF) via a variable resistor 118b. The variable resistor 118b is operable through the control panel 18 to adjust the resistance thereof. Depending upon the resistance value of the variable resistor 118b, the reference voltage which serves as a threshold value $V_1$ to be compared with the video signal level, varies. Therefore, by adjusting the resistance of the variable resistor 118b through the control panel 18, the threshold level $V_1$ of the comparator 118a can be adjusted.

It will be appreciated that the preferred embodiment of the video signal processing system monitors changes in the luminance level for detecting changes in the condition in the monitored area. Therefore, the binary video signal is variable between a HIGH level "1" and a LOW level "0" depending upon the luminance level of the video signal. In the shown embodiment, when the luminance level of the video signal is higher than the threshold level $V_1$, a HIGH level signal is output. When the luminance level of the video signal is lower than the threshold level $V_1$, a LOW level signal is output. Therefore, the binary video signal indicates the luminance level at each pixel by a HIGH or a LOW level signal.

Figure 6:
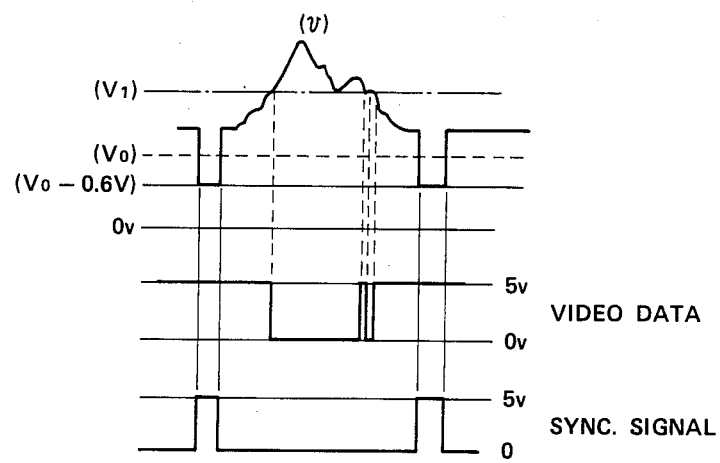
FIG. 6 is a timing chart showing the operation of the binary video signal generator circuit and the synchronization signal separator circuit depicted in FIG. 5.

The comparator 119a has an inverted input terminal connected to the video output terminal of the switcher 12 to receive therefrom the video signal. A non-inverting input terminal of the comparator 119a is connected to a reference signal value source $V_o$ and to the anode of a diode 121 whose cathode is connected to the output of the switcher 12. As shown in FIG. 6, the comparator 119a compares inputs at its inverting and non-inverting input terminals for detecting the synchronization signals contained in the video signal. The comparator 119a outputs a HIGH level pulse signal when the synchronization signal in the video signal is detected. The HIGH level pulse signal produced by the comparator 119a will be hereafter referred to as the "synchronization pulse". As set forth, the synchronization pulse output from the synchronization signal separator circuit 119 contains the vertical synchronization signal and the horizontal synchronization signals. The vertical synchronization signal is further separated by the vertical synchronization signal separator circuit 114.

Figures 7, 8:
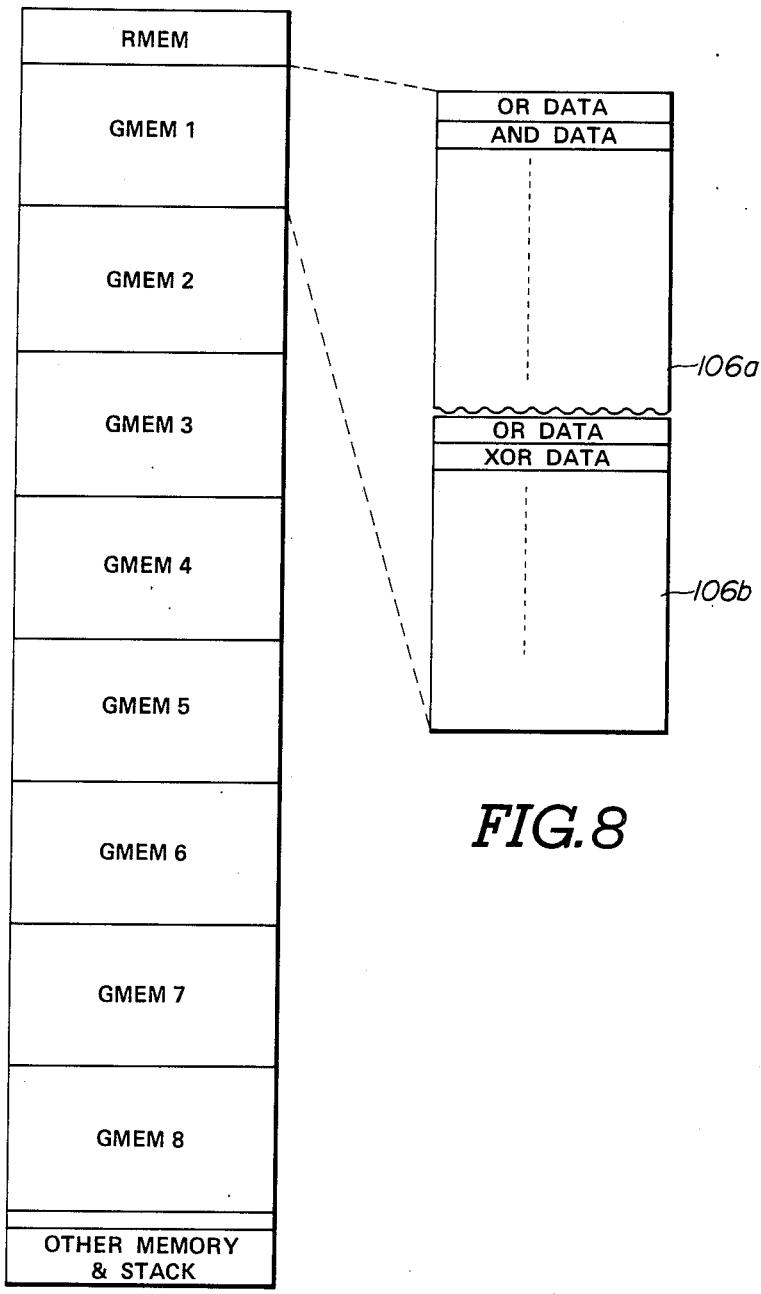
FIGS. 7 and 8 show the structure of a GMEM region in the RAM memory depicted in FIG. 2.
Figure 9:
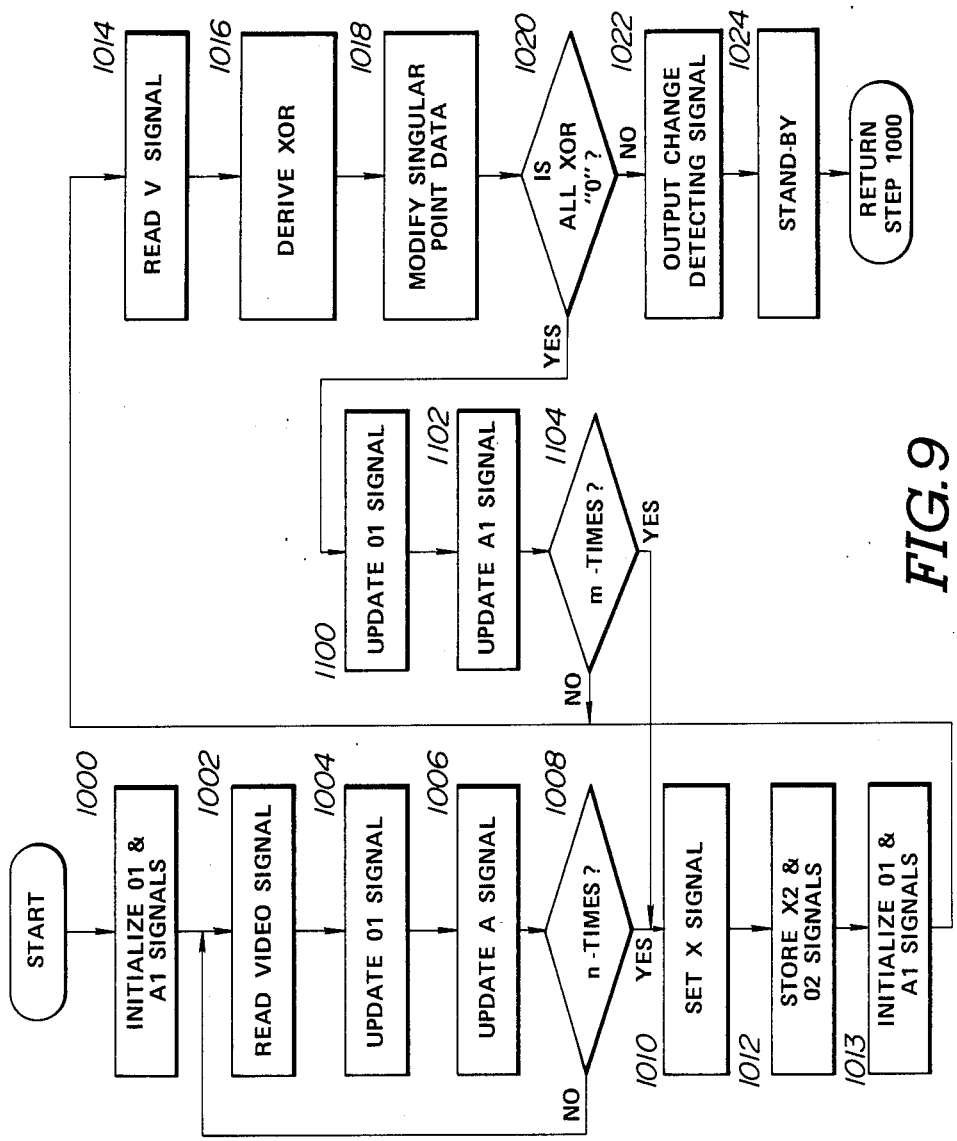
FIG. 9 is a flowchart showing the operation of the video signal processing system of FIG. 2.

The process for deriving the reference signal which is to be compared with the video data in the binary video signal output from the S/P converter circuit 120, will be described herebelow with reference to FIGS. 7 to 10. In these figures, FIG. 9 is a flowchart showing the operation for deriving the reference signal. FIG. 7 shows the arrangement of the RAM 106 and FIG. 8 shows the arrangement of each memory block GMEM1, GMEM2 ... GMEMn in the RAM 106. In these memory blocks, the video data of the respective monitor channel and the reference signal data corresponding thereto are stored. Therefore, when a single channel video signal is concerned, a single memory block will be used for storing the video data. As shown in FIG. 8, each memory address GMEM is composed of a first memory area 106a and a second memory area 106b. The first memory area 106a stores data for renewing the reference signal data. The manner of renewing the reference signal data will be described later. The second memory area 106b stores reference signal data in use. As will be fully explained further herein, the data stored in the first memory area 106a includes an OR data component which will be hereafter referred to as the "$O_1$ signal", and an AND data component which will be hereafter referred to as the "$A_1$ signal". The reference signal data stored in the memory area 106b is composed of the $O_1$ signal and an exclusive OR data component which will be hereafter referred to as the "$X_1$ signal". A pair of $O_1$ signal and $A_1$ signal stored in the memory area 106a constitutes data representative of the video data. A pair of $O_1$ signal and $X_1$ signal stored in the memory area 106b constitute the reference data.

The reference signal data is derived on the basis of the video data for several consecutive fields of video signals, as set forth above. Therefore, the video data of a predetermined number, e.g. n, of fields of video signals are sampled and stored in the memory area 106a in the form of pairs of $O_1$ signals and $A_1$ signals. In practice, the logical values (OR data and AND data) of the respective pixels are compared over the n fields of video data. By this operation, pixels whose logical values fluctuate can be detected. In deriving the reference signal, the reference data to be compared with the video data of the pixels whose fluctuation of the logical values are detected, will not be derived so that comparing operation of the video data and the reference data will never take place with regard to such pixels.

The process of deriving the reference signal and detection of a change of the video data will be discussed in further detail with reference to FIGS. 9 and 10. The program for deriving the reference signal is executed at predetermined intervals by the CPU 104. Upon starting execution, initialization is performed at a step 1000. In the process of initialization, the memory area 106a of the memory block GMEM is initialized. Initialization of the memory area 106a is performed by setting all of the $O_1$ signals to "0" level and by setting all of the $A_1$ signals to "1" level. At a step 1002, the video data (V signal) of the first field of video signal is read out. After this, the logical value of each pixel (i.e. "1" or "0") is compared with the $O_1$ signal in the corresponding address of the memory area 106a and a logical OR operation is performed to derive OR data therebetween. Using the newly derived OR data, the $O_1$ signal is updated at the step 1004. At a step 1006, the logical value of the pixel is compared with the $A_1$ signal of the corresponding address of the memory area 106a and a logical AND operation is performed to derive AND data therebetween. With the newly derived AND data, the $A_1$ signal in the corresponding address in the memory area 106a is updated.

Upon completing the process at the step 1006, a counter (not shown) is incremented by 1. This counter value is compared with a given value n which corresponds to the number of fields of video signals to be sampled, at a step 1008. When the counter value is smaller than n as checked at the step 1008, the process sequence returns to the step 1002 to repeat the processes of the steps 1002 through 1006 for the next video signal field. Therefore, the $O_1$ signal and the $A_1$ signal are updated n times. When the counter value reaches the given value n as checked at the step 1008, the process goes to a step 1010.

In the step 1010, a logical exclusive OR operation is performed on the $O_1$ signal and the $A_1$ signal to derive the exclusive OR data. The exclusive OR data which is newly derived, is set as an X signal. After this, at a step 1010, the $O_1$ signal as updated in the step 1004 and the X signal as derived in the step 1010, are stored, respectively, as the $O_2$ signal and the $X_2$ signal in the second memory area 106b of the GMEM memory block, at a step 1012. The $O_2$ signal and the $X_2$ signal serve as the reference data for the corresponding pixel. After completion of the process in the step 1012, all of the $O_1$ signals in the first memory area 106a are set to "0" and all of the $A_1$ signals in the first memory area 106b are set to "1", at a step 1013.

Figure 10:
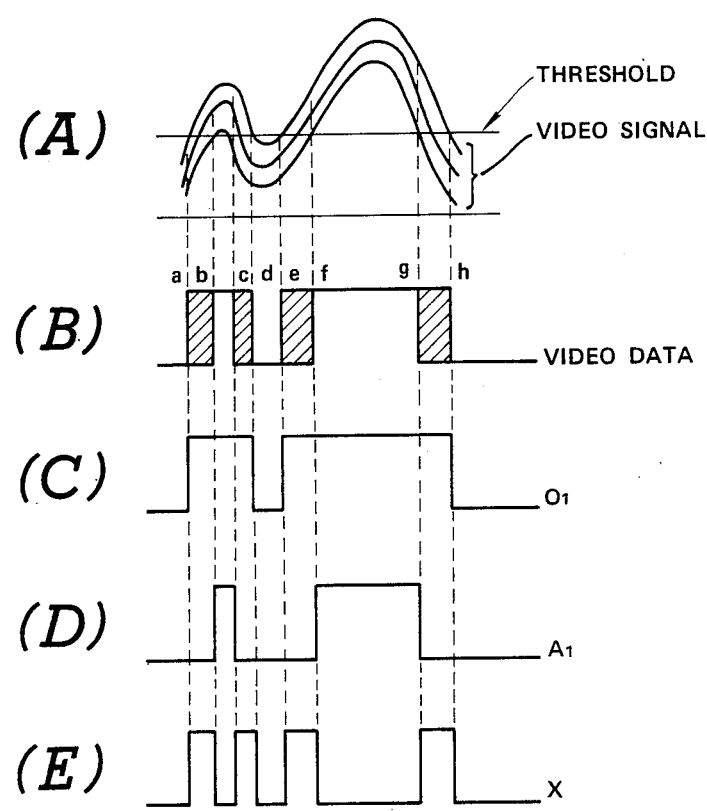
FIG. 10 is a timing chart showing the operation for deriving a reference signal as performed by the video signal processing system of FIG. 2.

The $O_1$ signal, which was n-times updated at the step 1004, will have an "0" value only when the OR values n-times derived are all "0" values, as shown in (A) through (C) of FIG. 10. The $A_1$ signal will have a "1" value only when all of the AND data n-times derived at the step 1006 are "1", as shown in (A), (B) and (D) of FIG. 10. Similarly, the $X_1$ signal as derived in the step 1010 will have a "0" value when the logical level of the video data over n-fields are held unchanged at the "1" value or the "0" value, and will have a "1" value when the logical value fluctuates among n-fields of video data.

Figure 11:
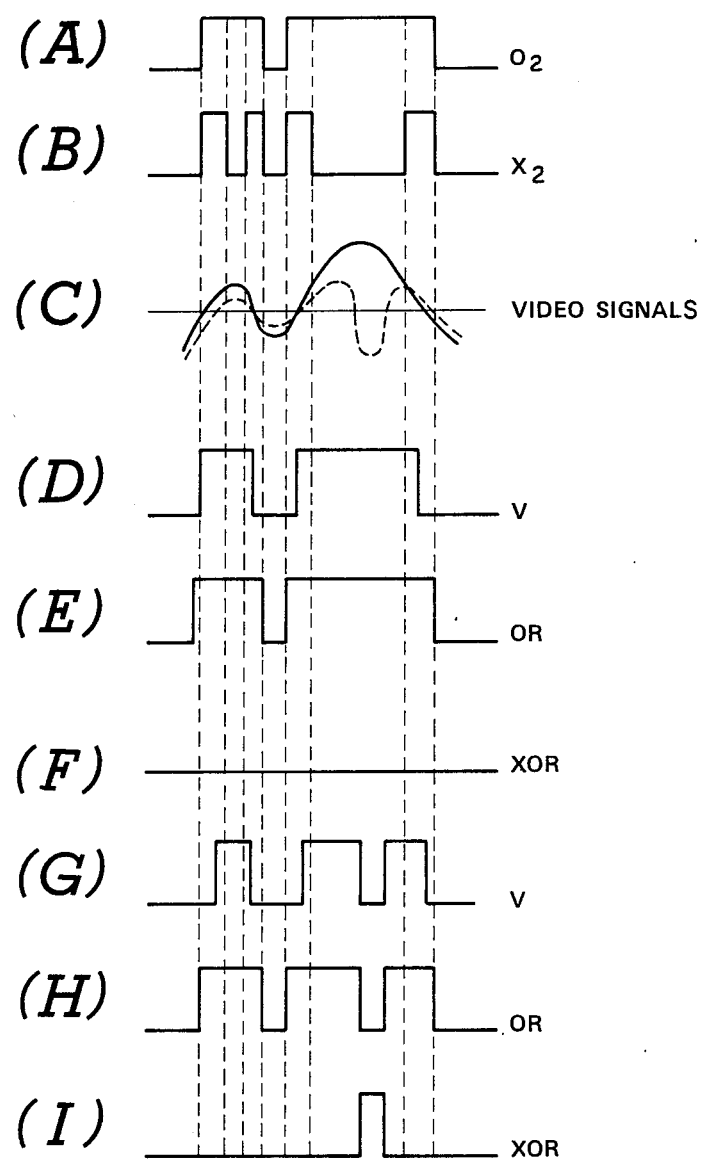
FIGS. 11A to 11I are timing charts showing the video signal processing operation for detecting changes in the video data as performed by the preferred embodiment of the video signal processing system of FIG. 2.

At a step 1014, the video data (V signal) of the subsequent field of the video signal is read out. After this, the logical value of each pixel is compared with the $X_2$ signal in the corresponding address of the second memory area 106b a logical OR operation is performed to derive OR data therebetween, as shown in (A), (B) (C), (D), (E) and (G) of FIG. 11. An exclusive OR logic operation is performed with respect to the derived OR data and the $O_2$ signal to derive an exclusive OR data (XOR) thereof at the step 1016, as shown in (E) and (F) of FIG. 11. The derived XOR with respect to each pixel is checked for finding out singular points in relation to the adjacent pixels, at a step 1018. In practice, a singular point is checked by comparing the XOR data derived in the step 1016 with the XOR data of the adjacent pixels. As shown in (D), (E) and (F) of FIG. 11, when video data is held unchanged, an XOR operation of the OR data and $O_2$ signal as derived in the step 1016 will produce "0" for all of the pixels. As shown in (G), (H) and (I), the XOR data will become "1" for the pixel whose the video data changes.

It is unlikely in a security monitor system for there to be a change in the video data for only one pixel while the video data of the adjacent pixels surrounding the changed pixel are unchanged. Therefore, when the XOR data of the pixel to be checked is "1" and all of the XOR data of the adjacent pixels are "0", a determination is made that the checked pixel is a singular point. In such case, the XOR data is modified to harmonize with the XOR data of the adjacent pixels.

After the process in the step 1018, the obtained XOR data of all the pixels are checked to determine whether all of the XOR data are "0", which would indicate that no video data has changed. If all of the XOR data are "0", then the process goes to a step 1100. In the step 1100, the logical value of the video signal is compared with the $O_1$ signal to obtain OR data for updating the $O_1$ signal with the obtained OR data. At a step 1102, the logical value of the video signal is compared with the $A_1$ signal to obtain AND data for updating the $A_1$ signal with the obtained AND data. Upon completing the process in the step 1102, a counter (not shown) is incremented by "1". After this, the counter value is compared with a given value m at step 1104. If the counter value is smaller than m, the process goes back to the step 1014 to repeat the process through the steps 1014, 1016, 1018, 1020, 1100 and 1102. If the counter value is equal to m, the process goes to the step 1010.

When at least one of the XOR data is "1" as checked at the step 1020, the process goes to a step 1022, in which a change detection signal is output. After outputting the change detection signal, the security monitor system is placed in a stand-by state for a given period of time. After expiration of the given stand-by period, the process returns to the step 1000 to resume security monitoring operations. Though the shown embodiment makes a determination that the condition in the monitoring area is changed when a change of the video data in at least one pixel is detected, it would be possible to slightly dull the sensitivity in order to avoid influence of signal noise which can superimpose on the video signal from the camera. This can be done by counting the number of pixels whose video data are changed and comparing the counter value with a given threshold value. This technique is substantially the same as that discussed in regard to the prior art. However, since the shown embodiment successfully avoids monitoring the pixels for which the video data fluctuates, the threshold value to be used can be small enough to yield satisfactorily high sensitivity.

As will be appreciated, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A video signal processing system for detecting a change in the video data contained in a video signal generated by a video signal source, comprising:
   a binary signl generator means for converting an analog video signal received from the video signal source into a corresponding binary value digital video signal containing logical values representative of the signal level of the respective pixels;
   a reference signal generator means supplied with the binary value digital video signal for sampling a predetermined number of video signal fields in the digital video signal for producing a digital reference signal on the basis of the video data of the sampled predetermined number of video signal fields, said reference signal containing a data component of each pixel, which data component is composed of an OR data component of corresponding logical values of the sampled video signal fields and an exclusive OR data component of the OR data component and the AND data components of the logical values of the sampled video signal fields;

wherein the reference signal generator means, in deriving the reference signal, compares the sampled predetermined number of video signal fields and excludes those pixels whose corresponding video data fluctuates in the sampled video signal fields so that the video data change detection comparing operation takes place only for those pixels whose video data is held constant over the sampled fields; and a detector means for detecting a change in the video data in the video signal by comparing each video signal field with the reference signal, the detector means producing a change detection signal when a change in the video data is detected.

2. A video signal processing system as set forth in claim 1, wherein the reference signal generator means sets initial values for the OR data components and the AND data components for all of the pixels so that the derived exclusive OR data component becomes a predetermined value when the video data of all of the pixels are held unchanged.

3. A video signal processing system as set forth in claim 2, wherein the detector means receives the digital video signal and performs a logical OR operation to derive an OR data component of the logical value and the exclusive OR data compnent of the reference signal with respect to each pixel and performs a logical OR operation to derive an exclusive OR data component of the derived OR data and the OR data component of the reference signal, and wherein the detector means checks the thus derived exclusive OR data for detecting a change in the video data with respect to each pixel to determine singular points of change.

4. A video signal processing system as set forth in claim 3, wherein the detector means compares the derived exclusive OR data of each pixel with the predetermined value for detecting a change in the video data and generating a change detection signal.

5. A video signal processing system as set forth in claim 4, wherein
the video signal source comprises a video signal camera directed toward a predetermined monitoring area to be monitored for picking-up a video image thereof and generating a corresponding video signal containing video data; and
further comprising an alarm responsive to the change detection signal for generating an alarm indicative of a change in the condition in the monitoring area.

6. A video signal processing system as set forth in claim 5, wherein the video signal camera comprises a plurality of cameras respectively directed toward different monitoring areas for picking up video images thereof and a switcher means for switching connections between the cameras and the video signal processing system according to a predetermined schedule.

7. A video signal processing system as set forth in claims 5 or 6, which further comprises a recording means responsive to the change detection signal for recording the current video signal upon the occurrence of the change detection signal.

8. A video signal processing system as set forth in claim 7, wherein the recording means comprises a video printer for printing a video image of the monitoring area on the basis of the current video signal at the occurrence of the change detection signal.

9. A video signal processing system as set forth in claim 7, wherein the recording means comprises a video tape recorder which is responsive to the change detection signal for recording the current video signal for a given period of time.

10. A video signal processing system as set forth in claim 5, which further comprises a video monitor for reproducing the video signal for visual observation of the monitoring area.

11. A video signal processing system as set forth in claim 4, wherein the reference signal generator means and the detector means are only active for monitoring a change in the video data for the pixels in a limited section of one video signal field.

12. A video signal processing system as set forth in claim 11, wherein the reference signal is generated by the reference signal generator means to contain only reference data of the pixels within the limited section.

13. A video signal processing system as set forth in claim 12, which further comprises a memory having a first memory block for storing video data of the pixels within the limited section and a second memory block for storing the reference signal.

14. A video signal processing system as set forth in claim 13, which includes a synchronization signal separator circuit for separating synchronization signals in the video signal and a pixel coordinate detecting means for receiving the synchronization signals separated by the synchronization signal separator circuit and detecting pixel positions in one field of the video image whereby the video data corresponding to the pixels within the limited section is detected and stored in the first memory block of the memory means.

15. A method for processing a video signal for detecting a change in the video data contained in a video signal generated by a video signal source, comprising the steps of:
converting an analog video signal received from the video signal source into a corresponding binary value digital video signal containing logical values representative of the signal level of the respective pixels;
generating a digital reference signal by sampling a predetermined number of video signal fields in the digital video signal, comparing the sampled predetermined number of video signal fields and excluding those pixels whose corresponding video data fluctuates in the sampled video signal fields so that the comparing step takes place only for those pixels whose video data is held constant over the sampled fields and producing a digital reference signal on the basis of the video data of the sampled predetermined number of video signal fields, said reference signal containing a data component of each pixel, which data component is composed of an OR data component of corresponding logical values of the sampled video signal fields and an exclusive OR data component of the OR data component and the AND data components of the logical values of the sampled video signal fields; and
detecting a change in the video data in the video signal by comparing each video signal field with the reference signal and producing a change detection signal when a change in the video data is detected.

16. A method for processing a video signal as set forth in claim 15, step of generating a reference signal further comprises the steps of setting initial values for the OR data components and the AND data components for all of the pixels so that the derived exclusive OR data component becomes a predetermined value when the video data of all of the pixels are held unchanged.

17. A method for processing a video signal as set forth in claim 16, where in the change detecting step comprises the further steps of receiving the digital video signal and performing a logical OR operation to derive an OR data component of the logical value and the exclusive OR data component of the reference signal with respect to each pixel and performing a logical OR operation to derive an exclusive OR data component of the derived OR data and the OR data component of the reference signal, and checking the thus derived exclusive OR data for detecting a change in the video data with respect to each pixel to determine singular points of change.

18. A method for processing a video signal as set forth in claim 17, wherein the detecting step comprises the further steps of comparing the derived exclusive OR data of each pixel with the predetermined value for detecting a change in the video data and generating a change detection signal.

19. A method for processing a video signal as set forth in claim 18, further comprising the step of generating the source video signal by directing a video camera toward a predetermined monitoring area to be monitored, picking-up a video image thereof and generating a corresponding video signal containing video data; and in response to the change detection signal, generating an alarm indicative of a change in the condition in the monitoring area.

20. A method for processing a video signal as set forth in claim 19, wherein source video signal generating step further comprises the steps of directing a plurality of cameras to different monitoring areas for picking up separate video images thereof and switching connections between the cameras and the video signal processing system according to a predetermined schedule.

21. A method for processing a video signal as set forth in claims 19 or 20, further comprising the steps of recording the current video signal upon the occurrence of the change detection signal.

22. A method for processing a video signal as set forth in claim 21, wherein the recording step comprises printing a video image of the monitoring area on the basis of the current video signal at the occurrence of the change detection signal.

23. A method for processing a video signal as set forth in claim 22, wherein the recording step comprises recording the current video signal for a given period of time by means of a video tape recorder in response to the change detection signal.

24. A method for processing a video signal as set forth in claim 19, further comprising the step of reproducing the video signal for visual observation of the monitoring area.

25. A method for processing a video signal as set forth in claim 18, wherein the detecting step is limited to only monitoring a change in the video data for the pixels in a limited section fo one video signal field.

26. A method for processing a video signal as set forth in claim 25, wherein the reference signal generating step further comprises generating the reference signal only with respect to reference data of the pixels within the limited section.

27. A method for processing a video signal as set forth in claim 26, wherein the reference signal generating step further comprises storing video data of the pixels within the limited section in a first digital memory block and storing the reference signal in a second memory block.

28. A method for processing a video signal as set forth in claim 27, wherein the reference signal generating step further comprises the steps of separating synchronization signals in the video signal, receiving the separated synchronization signals and detecting pixel positions in one field of the video image whereby the video data corresponding to the pixels within the limited section is detected and stored in the first memory block.

* * * * *